United States Patent

[11] 3,543,696

[72] Inventor James R. Posdal
 Glenview, Illinois
[21] Appl. No. 699,540
[22] Filed Jan. 22, 1968
[45] Patented Dec. 1, 1970
[73] Assignee Kraftco Corporation
 New York, New York
 a corporation of Delaware

[54] METHOD OF MAKING FUDGE, CARAMEL, FONDANT AND HARD CANDY TYPE CONFECTIONS
 12 Claims, 2 Drawing Figs.
[52] U.S. Cl. ................................................. 107/54,
 107/4
[51] Int. Cl. .................................................. A23g 3/02
[50] Field of Search ........................................... 107/54.6, 4

[56] References Cited
UNITED STATES PATENTS
3,356,045 12/1967 Karpenko et al. ............ 107/54.6

Primary Examiner—Laverne D. Geiger
Assistant Examiner—Robert I. Smith
Attorney—Anderson, Luedeka, Fitch, Even and Tabin ABSTRACT: The invention is directed to a method for the manufacture of confectionery products. A blend of confectionery ingredients is prepared which contains substantially the amount of water desired in the finished confectionery product. The blend is introduced into a mixer and is thereafter subjected to mixing and heating conditions. The mixing and heating conditions are sufficient to provide a blend of confectionery materials that have a consistency substantially similar to the consistency of confectionery products prepared by conventional methods.

Patented Dec. 1, 1970
3,543,696
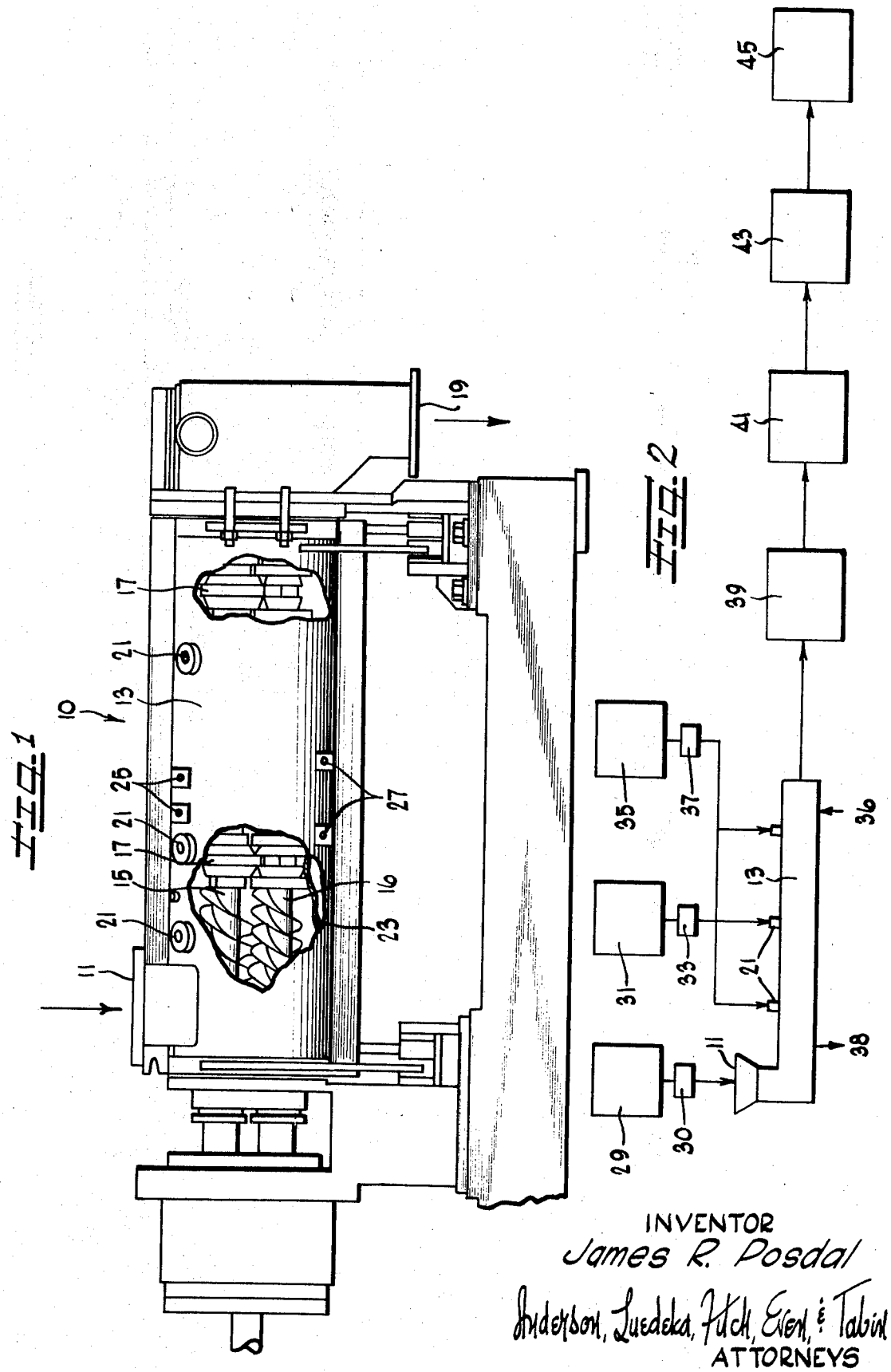
INVENTOR
James R. Posdal
Anderson, Luedeka, Fitch, Even, & Tabin
ATTORNEYS

METHOD OF MAKING FUDGE, CARAMEL, FONDANT AND HARD CANDY TYPE CONFECTIONS

The present invention relates to the production of confections and more particularly relates to an improved method for producing confections from a blend containing the desired level of moisture in the finished confection product.

Confectionery food products are largely sugar mixtures that may be divided into two general groups, depending upon the physical state in which the sugar is present. The crystalline, solid sugar phase is found in fondant types, and the liquid, or noncrystalline phase, which is sometimes referred to as an amorphous state, is found in hard candy, which is a highly super-cooled liquid. A wide variety of confections are made possible by regulating the proportion of the solid and liquid sugar phases present in the confection. Confections may be further classified under the following eight groups, depending upon the physical characteristics of the finished confection:

(1) Hard candy.
(2) Fondant.
(3) Fudge.
(4) Caramels.
(5) Marshmallows.
(6) Nougat.
(7) Lozenges.
(8) Jellies—starch, pectin and agar.

The physical characteristics of the finished confections are generally influenced by such factors as the levels of corn syrup, fats, invert sugar, nonfat milk solids and pectin present, and by physical manipulations of the batch, i.e., cooking time and temperature and the method of handling after removal from the cooker.

Whatever the type of confection that is produced, the make procedure generally includes the following steps:
1. a blend of various confection ingredients, including the sugar and water, is prepared;
2. the blend is heated until the blend boils;
3. heating is continued so as to evaporate a part of the water and form a saturated or super-saturated solution of sugar in water;
4. heating is discontinued and the mixture is cooled under controlled conditions to prevent premature crystallization of the sugar;
5. the batch is manipulated so as to provide the desired sugar phase and the desired crystal size if a crystalline phase is preferred;
6. the batch is stored, or tempered, to further develop the "-grain" or sugar crystal size.

Such above described conventional method for producing a confectionery food product is subject to several disadvantages. The cooking of the batch during the moisture removal step requires considerable attention, and batches are subject to a considerable level of variation unless a high level of skill is employed. The above-described method is also not adapted for continuous production of a confectionery product.

Various methods have been proposed for the continuous production of high moisture level confectionery products, such as marshmallows, wherein a blend is prepared containing the desired final level of moisture. See, for example, U.S. Pat. No. 2,847,311 to Doumak. However, it would also be desirable to provide a method which is adaptable to continuous production of low moisture confectionery products wherein the desired final level of moisture is contained in the original blend.

Accordingly, an object of the present invention is to provide a process for producing confectionery products which overcomes the disadvantages of heretofore known methods. Another object of this invention is to provide a continuous process for the production of confectionery products. A further object of this invention is to provide a process for the production of confectionery products which can be accurately controlled to provide a product of uniformly high quality. A still further object of the present invention is to provide a process for the production of satisfactory products wherein moisture is added to the original blend of confectionery materials at the level desired in the final product.

Other objects and advantages of the present invention will be readily apparent from the following detailed description of preferred embodiments thereof, when read in connection with the accompanying drawings, wherein:

FIG. 1 is a side elevation, partially broken away, of apparatus used in carrying out the method of the invention; and FIG. 2 is a flow sheet illustrating various features of the present invention.

In accordance with the process of the invention, any ingredients which have been heretofore employed in the manufacture of confectionery products may be used. These ingredients include sucrose from either cane or beet sources, water, milk solids, fats, chocolate products, invert sugar, dextrose, corn syrup, corn syrup solids, various gums, and various flavorings.

In a process embodying various of the features of the present invention for the manufacture of confectionery products, a blend of confection ingredients which contains sucrose and water is prepared. The blend contains substantially the amount of water desired in the finished confection product. The blend is then introduced into a mixer and the blend is subjected to a mixing step. Heating is effected during the mixing step. The mixing and heating steps are sufficient to provide a blend of confectionery materials that at the end of such steps has a consistency substantially similar to the consistency of conventionally prepared confectionery products obtained by preparing a blend of confectionery materials with excess water and boiling the blend until the desired level of moisture is obtained.

In the process of the invention, in preparing the blend of confectionery ingredients it is preferred to prepare a separate dry blend of the dry ingredients to be used in producing the confection product and to meter the blend of dry ingredients into a suitable mixer. The moisture is then separately metered into the mixer concurrently with the addition of the dry ingredients. For example, in preparing caramels by the method of the present invention, the blend of dry ingredients would include sucrose, corn syrup solids, milk solids nonfat, salt and whey solids.

During the mixing step of the present invention, heat is applied to the mixture of confectionery ingredients, including moisture. The temperature to which the confectionery ingredients are heated in accordance with the present invention corresponds to the equilibrium boiling temperature for the mixture. This equilibrium boiling temperature is well recognized in the art of producing confectionery products, and is the temperature at which a mixture of particular composition will boil at a particular pressure. The equilibrium boiling temperature is commonly referred to by the type of texture that is obtained when a sample of the mixture is dropped into cold water, i.e., soft ball, hard ball, hard crack, etc. For example, the soft ball temperature referred to in the manufacture of fudge refers to a temperature of about 228°F at sea level. Such temperatures are well known to those skilled in the art for the various confectionery products.

Any suitable mixing apparatus may be used in the practice of the present invention which will effect intimate dispersion of the confectionery ingredients during concurrent heating of the ingredients to the desired temperature. In general, the preferred mixing apparatus includes those types commonly referred to as high or medium intensity, high-shear, kneading mixers. These mixers include fully enclosed, continuous jacketed barrel type kneaders, such as the ones manufactured by the Baker-Perkins Manufacturing Company, and known as the Ko-Kneader and M-P mixer. A preferred type of mixer for the practice of the present invention is the M-P mixer, although batch type, high or medium intensity, high-shear, jacketed kneading mixers such as Banbury type mixers may also be used.

The M-P mixer is illustrated in FIG. 1. As seen in FIG. 1, the mixer 10 includes a loading hopper 11, a mixing barrel 13, dual shafts 15 and 16 containing mixing blades 17 and an outlet port 19. A motor 20 is provided for turning the shafts 15 and 16. Liquid injection ports 21 are provided along the length of the barrel for introduction of liquids, such as water, at the desired point in the mixing process. The mixer is provided with a jacket 23 into which steam or other heating media may be introduced through the inlet ports 25 and the outlet ports 27.

As shown in the schematic flow sheet of FIG. 2, the precombined dry ingredients are metered from a storage container 29 into the loading hopper 11 of the mixer 10 by dry metering means 30, such as a vibratory feeder. Water or other liquid is metered from a liquid storage tank 31 by means of metering pump 33 into the barrel 13 through liquid injection ports 21. Provision is made for adding the water through more than one injection port 21 if desired so that undesired localized wetting is avoided. A further liquid storage tank 35 and metering pump 37 is provided so that an additional liquid, such as a melted fat or oil, may also be added to the barrel 13 of the mixer. The storage tank 35 is preferably provided with heating coils to permit melting readily liquefiable materials, such as butter or other fats. Suitable valves (not shown) may be provided in each of the feed lines to control the flow of the liquids. The blend of liquid and dry confectionery ingredients is heated as it passes through the mixer barrel 13 by introducing steam or other heating media into the jacket of the mixer at the opening 36. A discharge opening 38 for the steam is also provided.

As previously indicated the invention provides a method for making confectionery products wherein only the desired level of moisture is added during the process. However, there is a loss of moisture during the simultaneous mixing and heating step of the invention which is compensated for by adding an additional amount of moisture equivalent to the loss. Such moisture loss is low and does not exceed about 3.5 percent of the final product. This is in no manner comparable to the conventional moisture reduction step in making confectionery products by prior art methods where a thin liquid dispersion of the confectionery ingredients are formed and are subsequently boiled for a substantial period of time to reduce the moisture level.

After the confectionery ingredients are blended and heated in the mixer they are discharged from the mixer containing the level of moisture desired in the final product.

It is believed that the sugar of the confectionery blend that is discharged from the mixer is substantially dissolved at the time of discharge. However, it should be understood that the process of the invention is not limited to providing confectionery blends wherein the sugar is substantially or wholly dissolved. For example, an ultra fine grind of sugar may be used with even shorter periods of mixing to provide a desired confection blend where the sugar is not substantially dissolved. Also, some confection blends do not require substantial dissolving of sugar in the finished product, such as grained confections like fudge, and dissolving of the sugar during the mixing step may not be necessary or desirable.

The blended confectionery ingredients may then be transferred to other treating equipment or to packaging equipment. For example, to produce grained candy, such as caramel or fudge, the blend of confectionery ingredients may be discharged into a batch mixer 39 and combined with up to about 10 percent by weight of a previously grained confectionery product which acts to seed the freshly mixed confectionery ingredients. Thereafter the seeded confectionery product may be transferred in turn to a graining room 41, to a controlled temperature storage room 43, and then to packaging equipment 45.

During passage of the confectionery ingredients down the length of the barrel of the mixer, the water is made to displace the air in the dry ingredients and to wet the entire surface of the particles of dry ingredients. This is accomplished by incremental transportation of portions of the material down the length of the barrel toward the outlet and kneading of the material by compressing it within the decreasing volume between the two rotating sets of arms during passage of the material through the mixer. The pressure of kneading tends to force water between the confectionery material particles, an action that displaces the air that has been present. It also causes shear of the partly mixed material. Also, as the mixer arms rotate, they tear loose portions of the partly mixed mass, carrying those portions to other parts of the mixer barrel, thus redistributing the contents. As the mass of confectionery ingredients becomes coherent through the mixing and heating actions, stretching takes place. That is, the mixer arms grip a portion of the material and stretch it much as a rubber band is stretched. The stretched material is then folded over on itself onto fresh material, and realinement of material is brought about. These actions, as described, occur repeatedly as the confectionery materials are transported down the length of the mixer barrel.

After the mixing step, the blended confectionery materials are discharged from the mixer and thereafter may be treated by various physical steps to obtain the desired end product. For example, to obtain a fudge type consistency, the blended confectionery material may be placed into a conventional batch-type sigma kneader and mixed with a small quantity of grained fudge to "seed" the blended batch of confection material. After the batch is seeded, it is discharged from the sigma kneader into graining pans. The graining pans are then covered and placed into a storage room for development of grain in the fudge.

The following examples are provided to further illustrate the process of the present invention, but are intended to in no way limit the scope of the invention, which is defined in the appended claims.

EXAMPLE I

Caramel was prepared in accordance with the following procedure: A blend of dry ingredients was prepared containing sugar, corn syrup solids sweet whey solids, milk solids, milk solids nonfat and salt. The ingredients were introduced into the bowl of a horizontal axis mixer. The mixer was run on low speed for 5 minutes in order to disperse the dry ingredients.

Hydrogenated coconut fat was placed into a tank containing a stainless steel coil of ¼-inch tube through which 140° F. water was circulated. This maintained the fat in a liquid condition for pumping. The outlet of the tank was connected to a metering pump. A separate stainless steel tank containing water was also connected to a metering pump.

A Baker-Perkins type MP mixer was used to mix the above ingredients. The blended dry ingredients were metered to the inlet hopper of the mixer at a rate of 120 pounds per hour. The water was fed to the first injection port of the mixer at a rate of 12.3 pounds per hour. Liquid fat was fed to the second injection port of the mixer at a rate of 12.5 pounds per hour.

The mixer was operated at an agitator speed of 65 r.p.m. Steam, at a temperature of 250° F., was fed to the jacket of the mixer. The water feed rate was in excess of that required in the final candy mixture by an amount of 40 percent. This amount of water was lost by evaporation during the mixing step, so that the final percent moisture of the caramel candy mixture was at the desired level of 8 weight percent.

The mixture of solids and liquids was transported through the mixer in about 3½ minutes. At the discharge end of the mixer a caramel candy mixture was obtained having good color and the correct moisture content. The mixture was discharged from the mixer at a temperature of 245° F.

The caramel candy mixture obtained from the M-P mixer was placed into a sigma blade mixer and was mixed for 20 minutes with one pound of grained caramel per 20 pounds of candy mixture so as to seed the caramel candy mixture. After the caramel candy mixture was seeded the batch was poured into graining pans. The graining pans were wrapped in polyethylene and were placed into a storage room having a temperature of 35° F. After two weeks storage the caramel was removed and placed into a 98° F. graining room for 24 hours. The caramel was removed and tempered at 70° F. for 2 hours and was then cut and wrapped. A caramel candy was obtained containing 92.0 percent solids. After storage for one week, the texture of the candy was satisfactory. The caramel candy was easy to chew and was mild in flavor and light in color.

EXAMPLE II

Hard candy was prepared in accordance with the procedure of example I. A dry blend was prepared containing sucrose, corn syrup solids and salt.

The dry blend was metered to the mixer at a rate of 2 pounds per minute. Water was introduced to the first injection port of the mixer at a rate of .07 pounds per minute. The mixer agitator was operated at a speed of 65 r.p.m. Steam was supplied at a temperature of 320° F. to the jacket of the mixer. A hard candy product was obtained containing 98.9 percent solids at a temperature of 310° F. The product which discharged from the mixer was obtained as a thin boiling liquid. The liquid was collected on a pan and was allowed to cool under ambient conditions. A hard candy was obtained which was a light amber in color.

EXAMPLE III

Fudge candy was prepared in accordance with the procedure of example I. A dry blend was prepared containing sucrose, corn syrup solids, whey solids, salt and milk solids nonfat.

Chocolate liquor and vegetable fat were blended together in the tank containing the heating coil. The chocolate liquor was 40 weight percent of the blend. The dry ingredients were metered to the mixer at a rate of 2 pounds per minute, and the chocolate liquor/vegetable fat mixture was metered to the second injection port of the mixer at a rate of 0.4 pounds per minute. Water was metered to the first injection port of the mixer at a rate of 0.4 pounds per minute. The water feed rate was in excess of that required in the first fudge candy mixture by an amount of 35 percent. The excess water was lost during the mixing step by evaporation. The agitator was operated at a speed of 65 r.p.m. and steam was supplied to the jacket of the mixer at a temperature of 245° F.

The fudge product, containing the desired level of moisture, was collected from the discharge of the mixer at a temperature of 242° F. and was placed into a sigma blade mixer. One pound of previously grained fudge was added for each 20 pounds of fudge product and the mixture was blended for 20 minutes. The mixture was then placed into a graining pan and was stored in a 35° Room for 7 weeks. The fudge was then removed from the 35° F. room and was tempered in a 70° room for 12 hours. The fudge at this point was completely grained and had a fine crystalline structure.

The method of the present invention for mixing confectionery products at the desired level of moisture is adaptable for any type of confectionery food formulations. It is particularly adapted for providing a mixture of confectionery ingredients at the desired level of moisture when the moisture level is less than about 10 percent by weight of the finished confectionery food product.

I claim:

1. A process for the manufacture of fudge, caramel, hard candy and fondant type confectionery products comprising the steps of providing a mixture of confection ingredients including sugar and water, introducing said ingredients into a high intensity, high shear, kneading mixer and subjecting said ingredients to a simultaneous mixing and heating step, said ingredients containing an amount of water only sufficient to provide at least a saturated solution of said confection ingredients during said mixing and heating steps, said mixing and heating steps being sufficient to provide a confectionery blend containing water at the level desired in the finished confectionery product.

2. A process in accordance with claim 1 wherein said finished confectionery product contains less than about 10 percent by weight of moisture.

3. A process in accordance with claim 1 wherein fondant type confection products are produced.

4. A process in accordance with claim 1 wherein hard candy type confection products are produced.

5. A process in accordance with claim 1 wherein said ingredients are heated during said mixing step to a temperature of at least the equilibrium boiling temperature of said mixture of confection ingredients at atmospheric pressure.

6. A process for the manufacture of fudge, caramel, fondant and hard candy type confectionery products comprising preparing a dry blend of confection ingredients including sugar, continuously adding said blend in metered amounts to a high intensity, high shear, kneading mixer, continuously adding water to said mixer, and subjecting said dry blend and said water to a simultaneous mixing and heating step, said water being added in an amount only sufficient to provide at least a saturated solution of said confection ingredients during said mixing and heating step, said mixing and heating step being sufficient to provide a confectionery product containing water at the level desired in the finished confectionery product.

7. A process in accordance with claim 6, wherein said finished confectionery product contains less than about 10 percent by weight of moisture.

8. A process in accordance with claim 6 wherein fudge type confection products are produced.

9. A process in accordance with claim 6 wherein caramel type confection products are produced.

10. A process in accordance with claim 7 wherein fondant type confection products are produced.

11. A process in accordance with claim 6 wherein a hard candy type confection product is produced.

12. A process in accordance with claim 6 wherein said ingredients are heated during said mixing and heating step to a temperature of at least the equilibrium boiling temperature of said mixture of confection ingredients at atmospheric pressure.